(12) United States Patent
Daniels et al.

(10) Patent No.: US 9,273,871 B2
(45) Date of Patent: Mar. 1, 2016

(54) COMBINED COMPACT HOT AND OZONATED COLD WATER UNIT

(75) Inventors: Ralph G. Daniels, Derry, NH (US); Jeffrey Ewell Deal, Livonia, MI (US)

(73) Assignees: HAMILTON ENGINEERING, INC., Livonia, MI (US); AWOIS, LLC, Auburn, NH (US)

( * ) Notice: Subject to any disclaimer, the term of this patent is extended or adjusted under 35 U.S.C. 154(b) by 593 days.

(21) Appl. No.: 13/463,291

(22) Filed: May 3, 2012

(65) Prior Publication Data

US 2012/0279929 A1 Nov. 8, 2012

Related U.S. Application Data

(60) Provisional application No. 61/482,421, filed on May 4, 2011.

(51) Int. Cl.
*C02F 1/78* (2006.01)
*F24D 17/00* (2006.01)
*D06F 35/00* (2006.01)

(52) U.S. Cl.
CPC .............. *F24D 17/0031* (2013.01); *C02F 1/78* (2013.01); *C02F 2301/046* (2013.01); *D06F 35/001* (2013.01); *F24D 17/0078* (2013.01)

(58) Field of Classification Search
CPC .............. B67D 1/0895; B67D 3/0022; B67D 2210/00002; B67D 2210/00013; B67D 2210/00023; B67D 2210/00026; B67D 1/0857; B67D 1/0858; C02F 1/78; C02F 1/02; C02F 2103/02; C02F 2201/78; C02F 2307/12; C02F 2301/046; C02F 2103/023; C02F 2303/04; D06F 35/001; D06F 17/00; D06F 31/00; F24D 17/00; F24D 17/0026; F24D 17/0031; F24D 17/0036; F24D 17/0073; F24D 17/0078; F24D 17/0094; F24D 2200/04; F24D 3/02; F28D 2020/0086; F28D 2020/0091; F28D 2020/0095
See application file for complete search history.

(56) References Cited

U.S. PATENT DOCUMENTS

| 4,501,262 | A  | * | 2/1985  | Lyon .............................. 126/640 |
| 5,366,619 | A  | * | 11/1994 | Matsui et al. ................. 210/139 |
| 6,506,309 | B1 |   | 1/2003  | Daniels et al. |
| 6,716,340 | B2 | * | 4/2004  | Meyer ......................... 210/167.3 |
| 7,430,884 | B2 |   | 10/2008 | Laithwaite |
| 7,614,260 | B2 |   | 11/2009 | Daniels et al. |
| 7,735,458 | B2 |   | 6/2010  | Stapensea |
| 2002/0027109 | A1 | * | 3/2002 | Conrad et al. ................ 210/760 |
| 2011/0120921 | A1 | * | 5/2011 | Kim ............................... 210/97 |

FOREIGN PATENT DOCUMENTS

KR   843313 B1 * 7/2008 ............. B01D 35/00

* cited by examiner

*Primary Examiner* — Lucas Stelling
*Assistant Examiner* — Rohit K Dewan
(74) *Attorney, Agent, or Firm* — Davis & Bujold PLLC; Michael J. Bujold

(57) ABSTRACT

A combined compact hot and ozonated cold water unit which comprises a framework that accommodates a hot water heater device, a ozone generator device and a combined temporary storage tank having both a hot water compartment and a separate cold water compartment. The hot water heater device is connected with the hot water compartment of the combined temporary storage tank for heating the water contained therein. The ozone generator device is connected with only the water compartment of the combined temporary storage tank for supplying ozone to the water contained therein.

20 Claims, 11 Drawing Sheets

COMBINED COMPACT HOT AND OZONATED COLD WATER UNIT

FIELD OF THE INVENTION

The present invention relates to a compact unit and a method of utilizing the compact unit for controlling the supply of ozonated water to a plurality of washing machines to which it continuously supplies an unrestricted flow of water to each one of the washing machines and achieves thorough and complete cleaning, sanitization and disinfection of the laundry being washed with the least amount of energy.

BACKGROUND OF THE INVENTION

The use of ozone for cleaning and sanitizing laundry has been known for quite some time. The primary reason is that ozone is generally recognized as being effective in cleaning as well as deodorizing and sanitizing laundry while minimizing impact to the environment. With respect to commercial applications, ozone is generally a preferred cleaning component as it is relatively inexpensive to manufacture and quite reliable in disinfecting and deodorizing laundry.

As is well known, the application of ozone to a cleaning fluid, such as water, acts as a disinfectant as well as assists with removing dirt, debris and other contaminants from the laundry detergent so that the laundry detergent can again be effective in removing dirt, debris and other contaminants from the clothing or other laundry being laundered.

While it is known that dissolving ozone in a liquid, such as water, will assist with improving the cleaning and sanitization efficiency of the water, a number of the currently available prior art systems suffer a variety of associated drawbacks. In particular, a portion of the ozone which is added to the water does not become completely dissolved within the water so that it can not directly contact any substance(s) dissolved or contained within the water. As a result, the undissolved ozone rapidly gasses off, dissipates and/or evaporates from the water as soon as the water enters into a reservoir or some other expansion chamber, for example. Accordingly, such undissolved ozone is not effective cleaning and/or disinfecting and thus not all of the ozone, which is added to the water, is active or effective in achieving the desired cleaning and/or sanitization intended by the ozonated water.

It is to appreciated that washing laundry can be a relatively expensive process. It utilizes costly resources—water, energy, detergents and labor and such laundering is often not only required to clean but also to disinfect the laundered items. While conventional detergents and soaps can be effective in removing dirt, grease, grime and other contaminants, they are not always effective in killing germs and bacteria. The application of ozone to the water is known to enhance the disinfection capabilities of conventional detergents and soaps. Ozone generally improves cleaning of laundry, even at cold water wash temperatures, and also has an antibacterial effect.

SUMMARY OF THE INVENTION

Wherefore, it is an object of the present invention to overcome the above mentioned shortcomings and drawbacks associated with the prior art.

Another object of the present invention is to provide a compact unit which incorporates (1) a hot water heating unit, (2) an ozone generator, (3) a hot water storage tank, and (4) a cold water storage tank, along with associated plumbing and pumps, and combines and contains all of these components within a single unit. The combined and compact unit has the additional feature of the top surface thereof preferably forming a utilization/folding surface which can be utilized by patrons or customers of the laundry mat for folding their laundry, placing cleaning supplies thereon, temporarily storing laundry baskets or other laundry accessories thereon, etc.

A further object of the present invention is to provide a compact unit which can be accommodated within a relatively small space (e.g., typically a floor space measuring approximately no greater than about 7'×3' or 4'×4', for example, so that the compact unit can be readily installed within either an existing laundry mat or a new laundry mat with only minimal alteration to the laundry mat facility while still ensuring an adequate and unrestricted supply of hot water, warm (i.e., tepid) water and ozonated cold water to each one of the washing machines located within the laundry mat and thereby maximize cleaning of the laundry to be washed while minimizing the amount of energy required to obtain such clean, deodorized and sanitized laundry.

Yet another object of the present invention is to utilize only hot water, which is not ozonated, during an initial hot water wash cycle and thereafter primarily use cold water during any other wash cycle(s), and also during all of the rinse cycles, so as to minimize the amount of energy required to heat the water while still maximizing cleaning, deodorizing and sanitization of the laundry being laundered.

Yet another object of the present invention is to provide an ozone injection system in which the amount of ozone, which is injected or otherwise added to the cold water, generally increases as the flow rate of the cold water from the temporary storage tank to the washing machines increases. That is, as the flow rate of the cold water from the temporary storage tank to the washing machines increases, this generally causes a pressure drop within the temporary storage tank and on the outlet side of the venturi which, in turn, assists with sucking or drawing in additional ozone, via the ozone inlet of the venturi, thereby ensuring an adequate amount of ozone being supplied to and dissolved and/or dispersed within the cold water prior to supplying the same to a washing machine.

A still further object of the invention is to provide a water supply system in which the water to be supplied to each one of the washing machines is always adequate and does not in any way restrict or inhibit water filling rate of any of the washing machines, particularly when three or more washing machines, for example, are being simultaneously filled with hot water and/or cold water by the combined hot and ozonated cold water compact unit. As a result, each one of the washing machines is able to be quickly and reliably filled during the shortest possible filling time.

A still further object of the present invention is to provide a circulation system, for the hot water, so as to ensure an ample supply of hot water is always continuously and readily available for supply to any one of the washing machines located within the laundry mat and also provide a circulation system, for the cold water, so as to ensure that an ample amount of ozone is always adequately dissolved within the cold water prior to supplying the ozonated cold water to the washing machine.

The present invention also relates to a combined compact hot and ozonated cold water unit comprising a framework accommodating: a water heating device; a ozone generator device; a combined temporary storage tank having both a hot water compartment and a separate cold water compartment; the water heating device being connected with the hot water compartment of the combined temporary storage tank for heating the water contained therein; and the ozone generator device being connected with only the water compartment of the combined temporary storage tank for supplying ozone to the water contained therein.

As used within this patent application, the term "hot water" generally refers to water having a water temperature of between about 85° F. and about 105° F.—although higher water temperatures are possible and considered within the spirit and scope of the present invention; the term "tepid water" generally refers to water having a water temperature between about 72° F. and about 85° F.; and the term "cold water" generally refers to water having a water temperature between about 72° F. or less.

The present invention incorporates some of the features and teachings of U.S. Pat. Nos. 6,506,309 7,430,884 and 7,614,260 and the subject matter of those patents is hereby incorporated by reference. In addition, the present invention also incorporates some of the features and teachings of U.S. Pat. No. 7,735,458 and the subject matter of that patent is also hereby incorporated by reference.

BRIEF DESCRIPTION OF THE DRAWINGS

The invention will now be described, by way of example, with reference to the accompanying drawings in which.

DETAILED DESCRIPTION OF THE INVENTION

Figure 1:
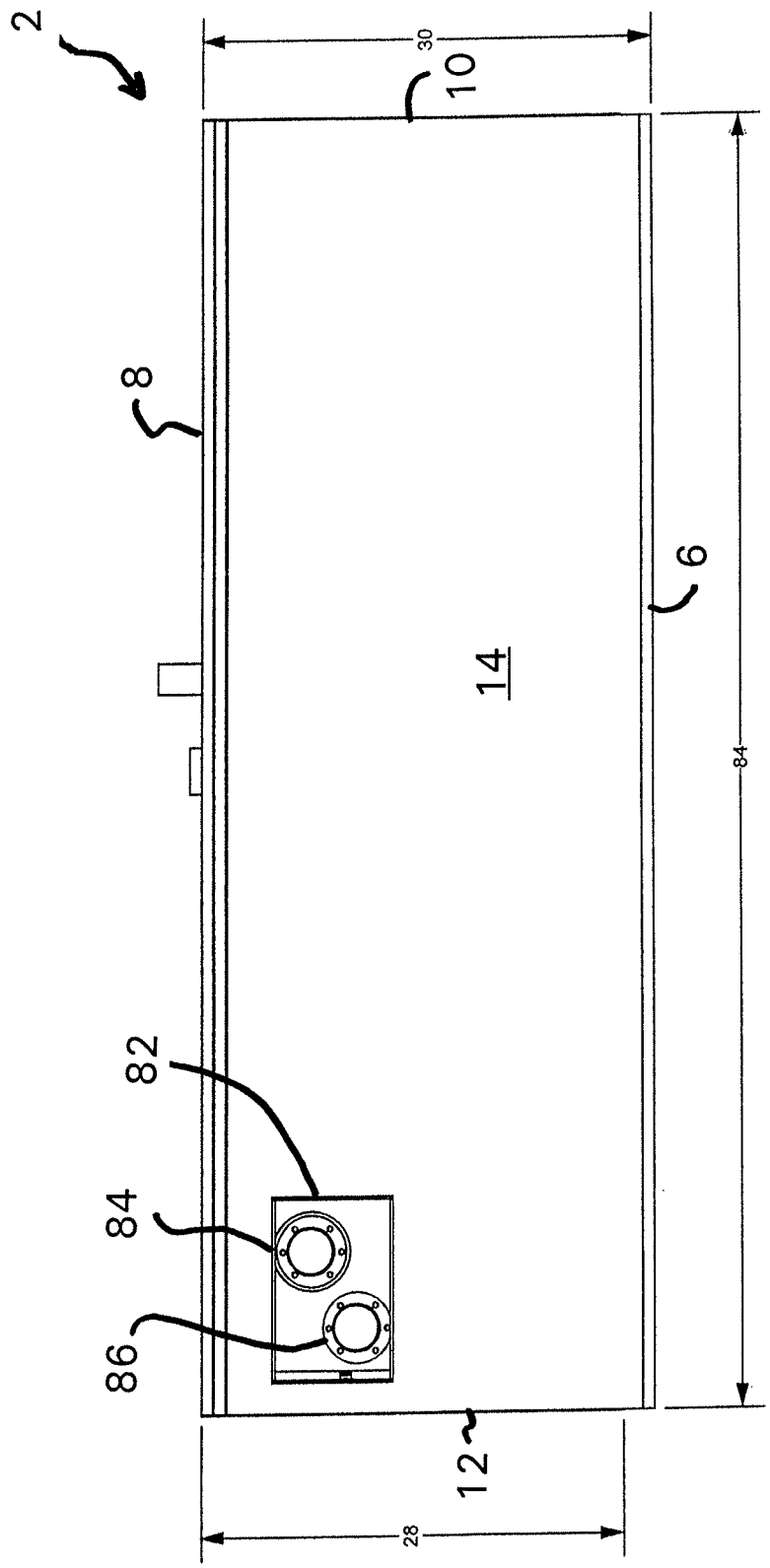
FIG. 1 is a diagrammatic top plan view of the combined compact hot and ozonated cold water unit, according to the present invention.
Figure 2:
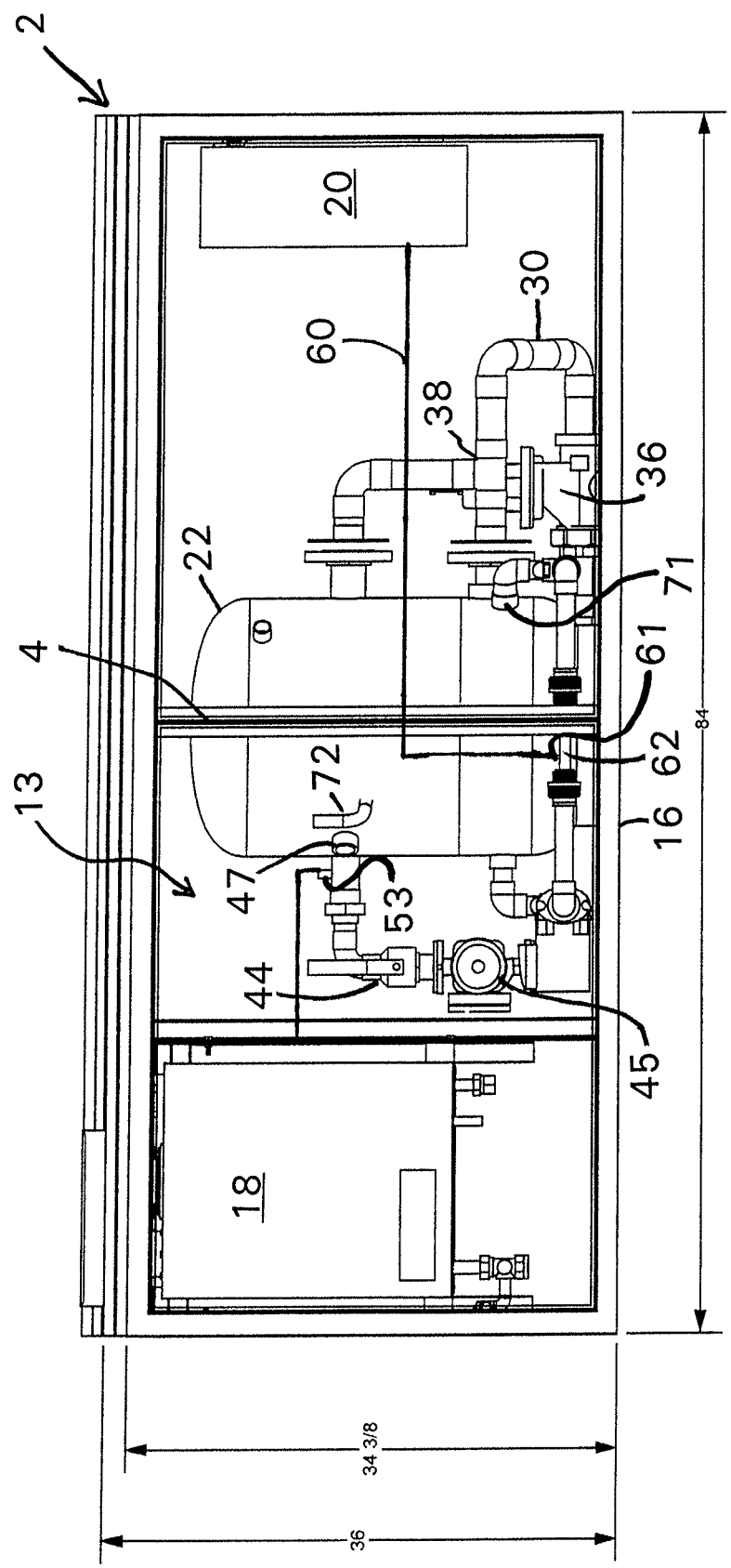
FIG. 2 is a diagrammatic front elevational of FIG. 1 with the front panel removed for clarity so as to reveal the internal components.
Figure 3:
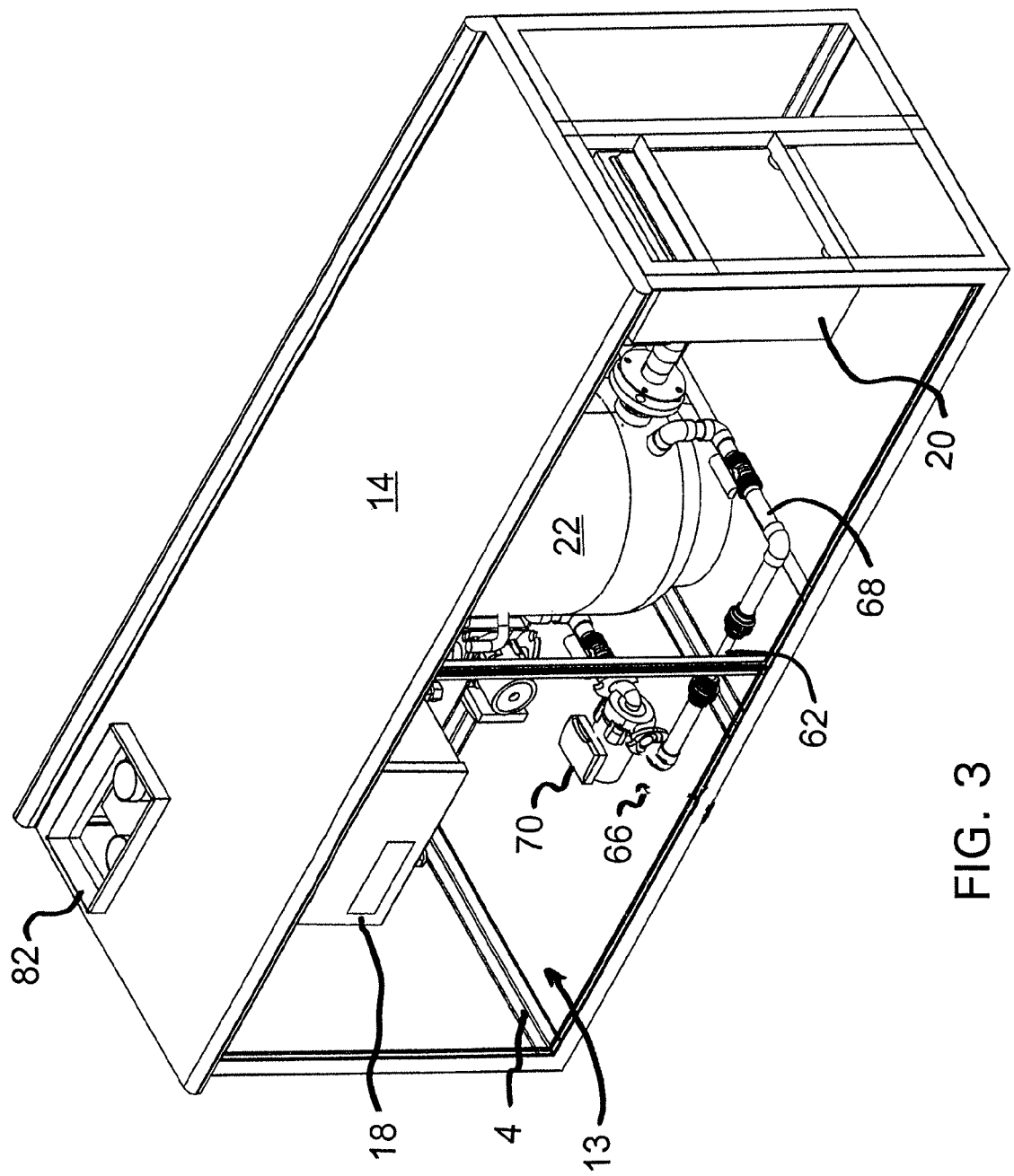
FIG. 3 is a diagrammatic top, front, right side perspective view of FIG. 1 with the front and right side panels removed for clarity.
Figure 4:
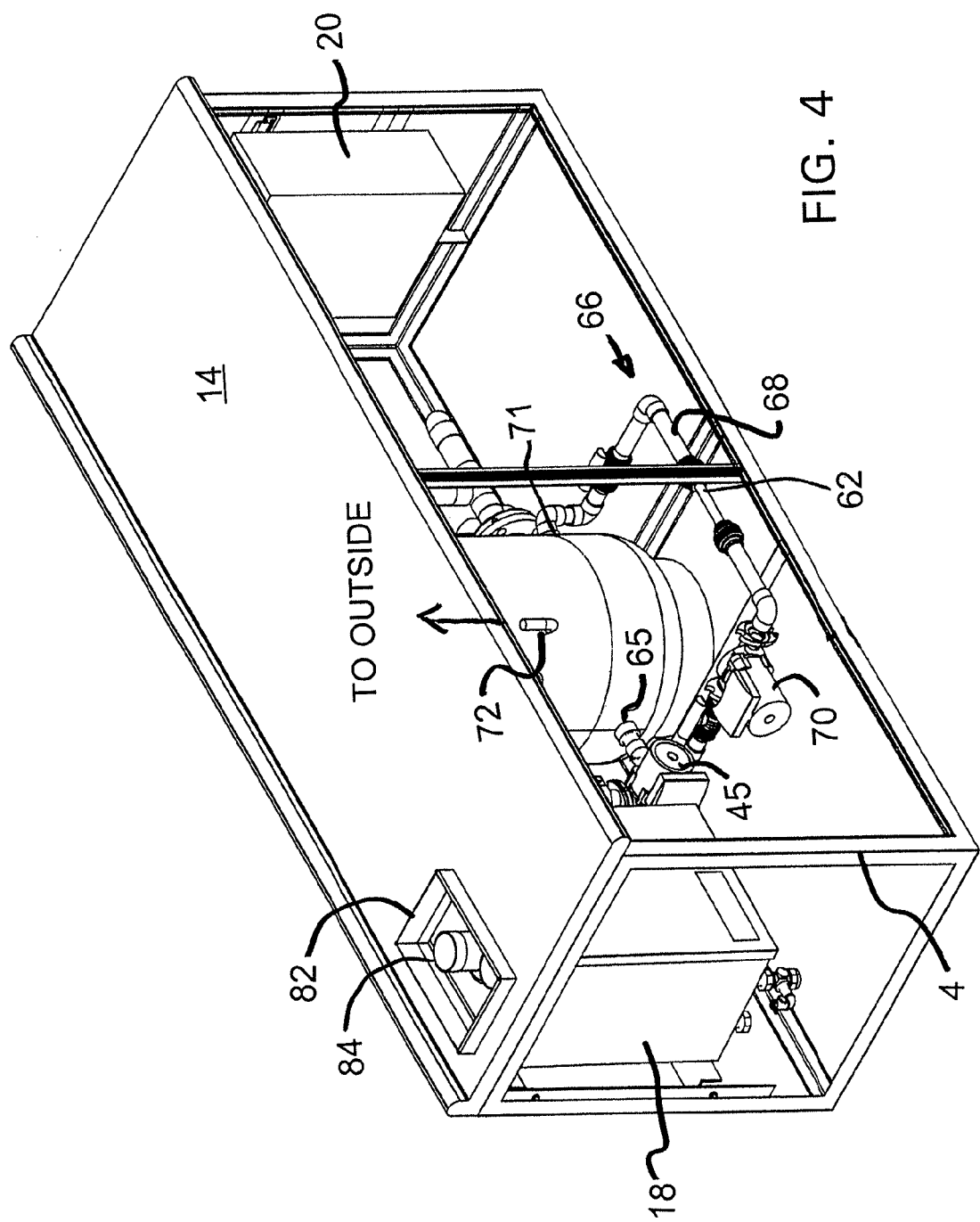
FIG. 4 is a diagrammatic top, front, left side perspective view of FIG. 1 with the front and left side panels removed for clarity.
Figure 5:
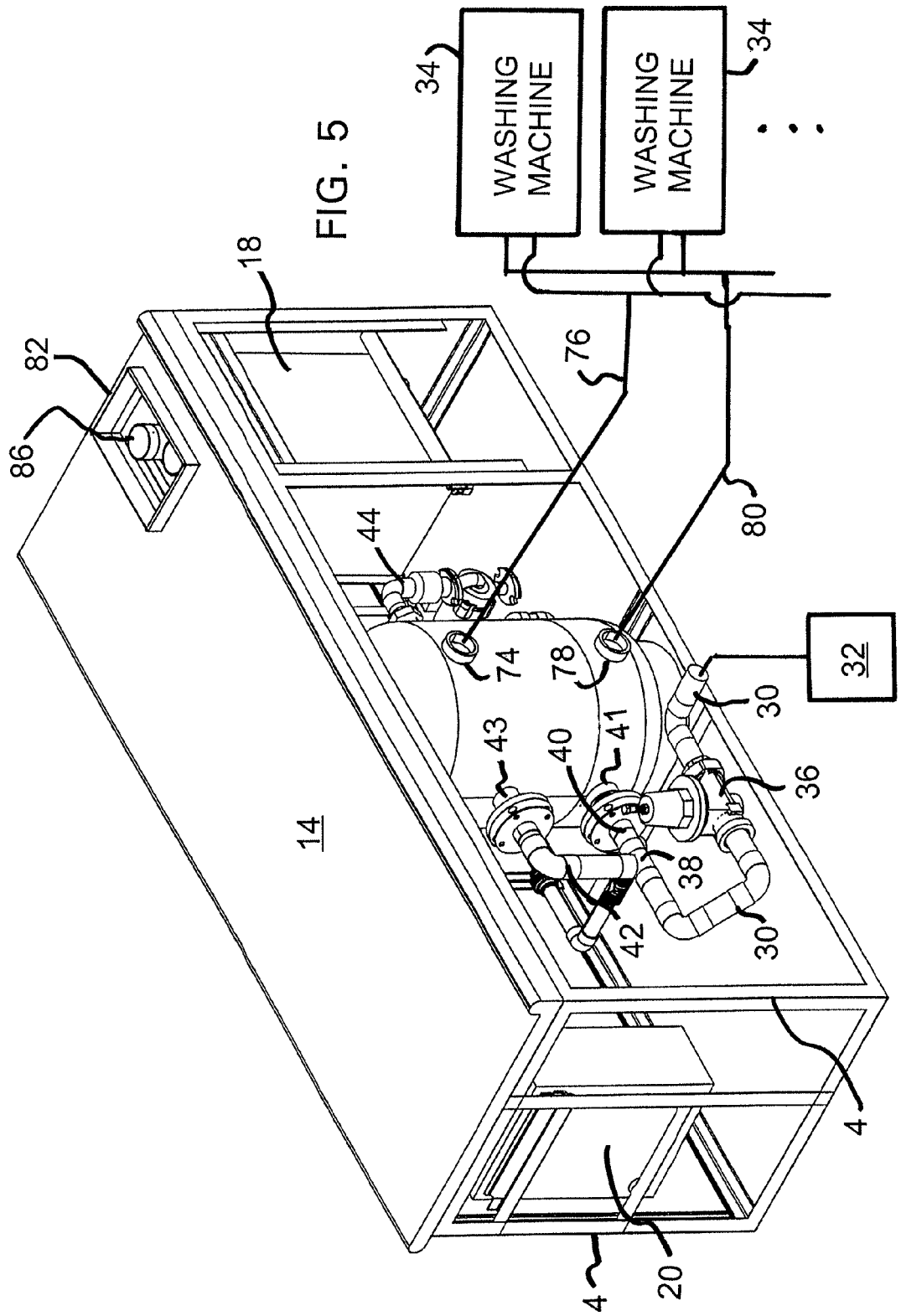
FIG. 5 is a diagrammatic top, rear, right side perspective view of FIG. 1 with the rear and right side panels removed for clarity.
Figure 6:
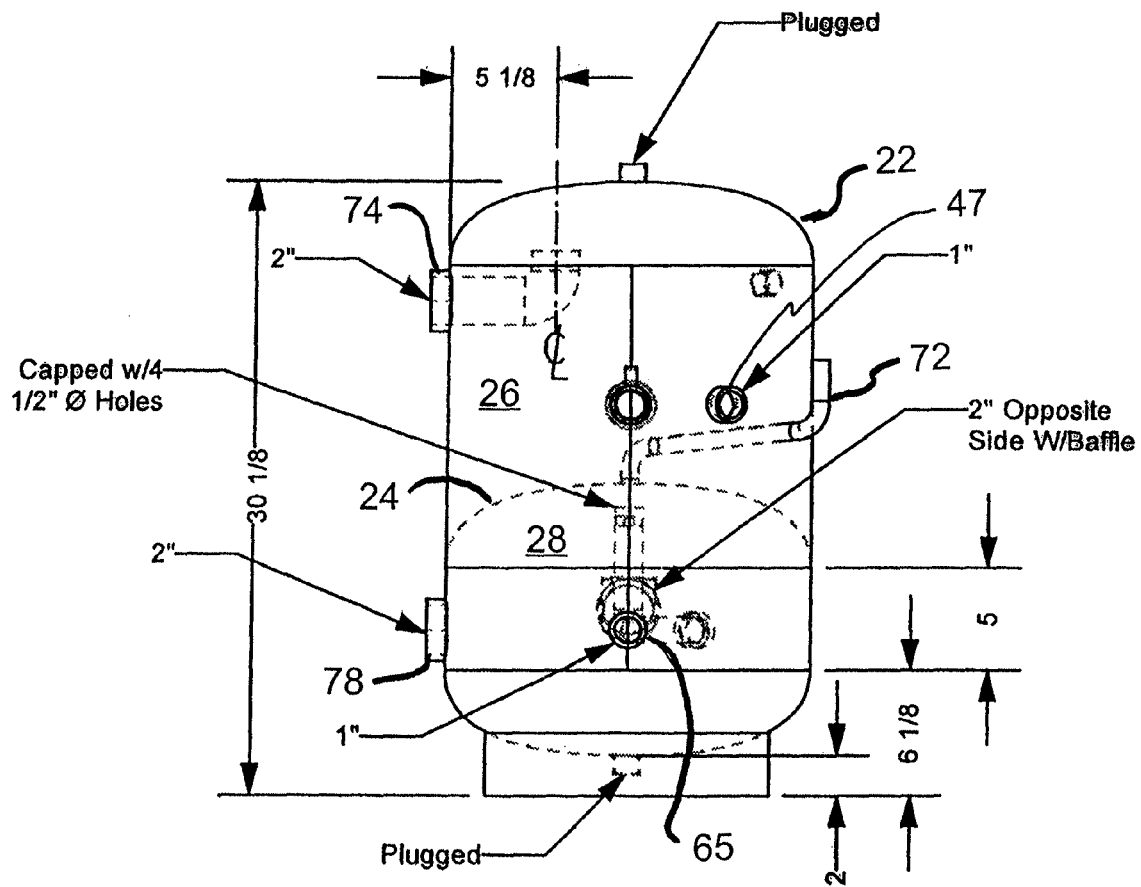
FIG. 6 is a diagrammatic front elevational view of the combined hot water and cold water storage tank.
Figure 7:
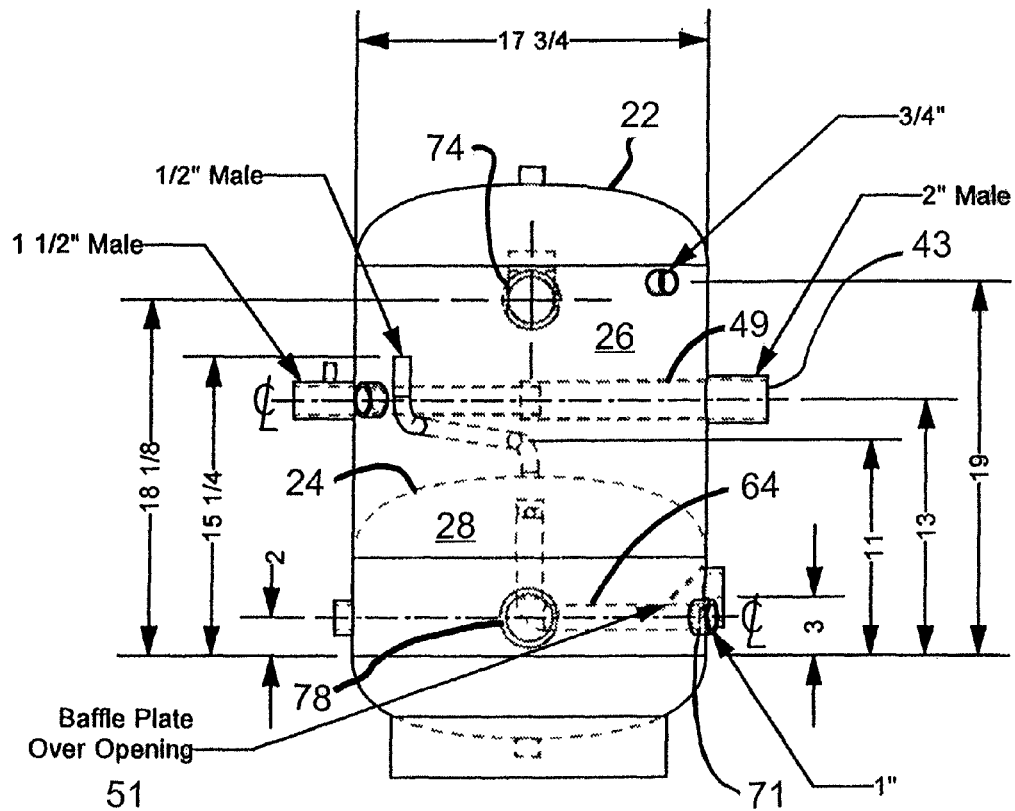
FIG. 7 is a diagrammatic right side elevational view of the combined hot water and cold water storage tank of FIG. 6.
Figure 8:
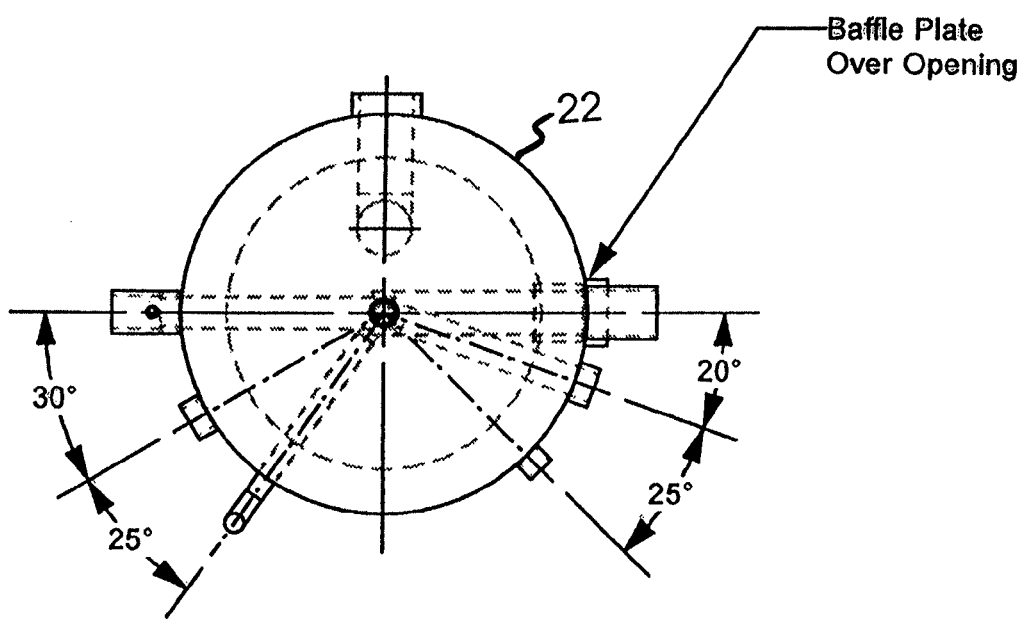
FIG. 8 is a diagrammatic top plan view of the combined hot water and cold water storage tank of FIG. 6.

Turning now to FIGS. 1-8, a brief description concerning the various components of the combined hot and ozonated cold water compact unit 2, according to the present invention, will now be briefly discussed. As shown in this embodiment, the combined hot and ozonated cold water compact unit 2 generally comprises a framework 4 for supporting and accommodating the internal components (discussed below) of the compact unit. The internal framework 4 is typically respectively closed on all four sides by at least one front panel 6, at least one rear panel 8, a left panel 10 and a right panel 12. If desired, one or more of these panels 6, 8, 10 and 12 may be secured to the framework 4 by a conventional hinge and latch mechanism (not shown) in order to facilitate ease of access to the internal cavity 13, defined by the framework 4, when desired by service personnel. One or more conventional locks may be utilized on the panels to prevent unauthorized access to the interior cavity 13. Alternatively, the panels 6, 8, 10 and 12 can be secured to the framework 4 by conventional fasteners (not shown), such as bolts, screws, etc., to minimize unauthorized access to the interior cavity 13 and such conventional fasteners will typically only be removed by service personnel when access to the interior cavity is desired or necessary for servicing or adjustment of any of the internal components of the combined hot and ozonated cold water compact unit 2.

In addition, the top surface 14 of the framework 4 forms a utility/folding surface which permits folding laundry, accommodating or placement of various laundry accessories, belongings, items of patrons and customers of the laundry, etc. All of the internal components are either directly supported by the internal framework 4 or are directly supported by the bottom surface 16 of the internal framework 4. This arrangement permits all of the internal components to be conveniently accommodated within the combined hot and ozonated cold water compact unit 2 and assists with quick and easy installation of the compact unit, at a desired laundry mat facility, as a complete unit.

With reference to FIGS. 2-5, it can be seen that a condensing hot water heater device 18 (e.g., powered by gas or propane, for example), a conventional ozone generator device 20 and a combined hot and cold water temporary storage tank 22 are all accommodated within the internal cavity 13 of the combined hot and ozonated cold water compact unit 2. The temporary storage tank 22 is divided or partitioned by an internal dividing wall 24 (see FIGS. 6 and 7) into a hot water compartment 26 and a separate cold water compartment 28. The hot water compartment 26 typically has storage capacity of between about 10 and 50 gallons of hot water, for example, and more preferably has a storage capacity of about 20 gallons of hot water, while the cold water compartment 28 typically has storage capacity of between about 5 and about 35 gallons of cold water, for example, and more preferably has a storage capacity of about 10 gallons of cold water.

A conventional water supply line 30 (see FIG. 5) is typically connected to either municipal water supply or a well, generally designated as 32, for supplying water to the temporary storage tank 22. The temporary storage tank 22, in turn, supplies hot and/or cold water to each one of the washing machines 34 of the laundry mat, as will be described below in further detail. This water supply line 30 is typically connected with a variable pressure control valve 36 which regulates the pressure of the water being supplied to the temporary storage tank 22 from either the municipal water supply or the well 32. The water supply line 30 includes a T-shaped coupling 38, located between the variable pressure control valve 36 and the temporary storage tank 22, which splits the water supply line 30 into two separate water supply lines. A first segment 40 of the water supply line is connected with a cold water supply inlet 41 of the cold water compartment 28 while a second segment 42 of the water supply line is connected with a hot water supply inlet 43 of the hot water compartment 26.

The condensing hot water heater device 18 is connected with a heating outlet 46 of the hot water compartment 26 of the temporary storage tank 22, via a supply leg of a hot water circulation conduit 44, for normally supplying the cold water, along with some of the hot water contained within the hot water compartment 26 of the temporary storage tank 22, as discussed below in further detail, to the hot water heater device 18 for suitable heating. The heated hot water is then conveyed back to the hot water compartment 26 of the temporary storage tank 22, via a return leg of the hot water circulation conduit 44 and a hot water inlet 47, for temporary storage until the hot water is required by any of the washing machines 34. The hot water heater device 18 heats the supplied generally combined hot and cold water, in a conventional manner, prior to returning the same back to the hot water compartment 26 of the temporary storage tank 22. A hot water pump 45 is provided along the return leg of the hot water circulation conduit 44 to facilitate pumping water from the temporary storage tank 20 to the hot water heater device 18 and thereafter returning the heated water back to the temporary storage tank 22.

A temperature sensor 53 is located within the hot water compartment 26, of the temporary storage tank 22, to measure the water temperature of the hot water contained within the hot water compartment 26. The temperature sensor 53 is coupled to a control panel (accommodated within the hot water heater device and not shown in detail) which contains suitable software for controlling the heating and reheating of the water contained within the hot water compartment 26 of the temporary storage tank 22 by the hot water heater device 18, as necessary. The sensor 53 also immediately detects when any cold water enters the hot water compartment 26 of the temporary storage tank 22 (a normal occurrence when one or more of the washers begin to fill with either hot or tepid water) and accordingly activates the heating cycle of the hot water heater device 18. Such design minimizes any temperature degradation of the heated water, contained within the hot water compartment 26 of the temporary storage tank 22, prior to delivery to the washers.

In the event that the temperature of the hot water contained within the hot water compartment 26 falls significantly below 105° F., e.g., a few degrees or so below 105° F. for example, then the hot water pump 45 is activated, by the control panel CP, to pump water from the hot water compartment 26 to the hot water heater device 18, for reheating, and thereafter return the heated water back to the temporary storage tank 20. This facilitates maintaining the hot water, contained within the hot water compartment 26 of the temporary storage tank 22, at a desired hot water supply temperature, e.g., a hot water temperature of about 105° F., for example. Such reheating of the hot water is typically required when there is an excess period of time between initial heating of the hot water and the subsequent use of the hot water by any one of the washing machines 34.

To facilitate both initial heating of the originally supplied cold water supplied to the hot water compartment 26 as well as reheating of the hot water contained therein, a hot water supply manifold 49 interconnects the cold water inlet 43, of the hot water compartment 26, directly with the heating outlet 46 of the hot water compartment 26 of the temporary storage tank 22. The hot water supply manifold 49 is manufactured substantially in accordance with U.S. Pat. No. 7,735,458, and the teachings of that reference are incorporated herein by reference. As a result of this arrangement, substantially all of the cold water, initially supplied to the hot water compartment 26, is directly conveyed, via the hot water supply manifold 49, through the hot water compartment 26 to the hot water heater device 18 for heating. The hot water supply manifold 49 has a plurality of apertures provided in the exterior surface of the conduit which permits, depending upon the flow rate through the hot water supply manifold 49, some of the hot water to be drawn into the hot water supply manifold 49, and mix with and be conveyed along with the cold water flowing within the hot water supply manifold 49, as the cold water flows therealong toward the hot water heater device 18 for initial heating. This arrangement generally ensures that all of the cold water is initially heated before being directly discharged back into the hot water compartment 26 of the temporary storage tank 22 for conveyance to any of the washing machine(s) 34.

As the cold water enters, via the cold water inlet 41, into the cold water compartment 28 of the temporary storage tank 22, the cold water initially is redirected by a baffle 51 (see FIG. 7) in a circumferential direction to induce a swirling motion of the water stored within the cold water compartment 28 of the temporary storage tank 22. This swirling motion assists with agitating and mixing as well as maintaining and/or redissolving of any undissolved and non-vented ozone contained within the cold water compartment 28 of the temporary storage tank 22.

The cold water compartment 28 of the temporary storage tank 22 also includes a cold water circulation loop 66 which pumps cold water, via a first leg of a circulation conduit 67, from the cold water outlet 65 of the cold water compartment 28 to a circulation pump 70. A discharge end of the circulation pump 70 is directly connected with a venturi 62. An outlet of the venturi 62 communicates, via a second leg of the circulation conduit 68, with the cold water supply inlet 71 of the cold water compartment 28. The ozone generator device 20 is connected with an inlet of the venturi 62 for supplying ozone thereto via line 60. The ozone generator device 20 generates a suitable amount of ozone, to be supplied to and dissolved within the cold water being pumped by the circulation pump 70, so that when this ozonated cold water is eventually returned back to the cold water compartment 28 and then supplied to any one of the washing machines 34, the supplied ozonated cold water will contain an adequate amount of ozone, dissolved therein, to facilitate the desired cleaning, disinfection and/or sanitation of the laundry being washed. That is, the circulation loop 66 ensures that a sufficient amount of ozone is constantly and continuously dissolved within the cold water contained within the cold water compartment 28 of the temporary storage tank 22, prior to supplying the same to any of the washing machines 34 of the laundry mat. In addition, in the event that a sufficient amount of ozone dissolves out of the cold water, the circulation loop 66 can be activated so as to dissolve additional ozone within the cold water contained within the cold water compartment 28.

As is conventional in the art, the venturi 62 assists with initially accelerating the supplied cold water, as the cold water initially enters the entrance of the venturi 62 and then mixes with the ozone, supplied via the ozone inlet 60. Thereafter, the ozone/water mixture then decelerates as this mixture exits the venturi 62 and flows along the second leg of the circulation conduit 68 and is discharged, via a circulation inlet, into the cold water compartment 28 of the temporary storage tank 22. During conveyance along the second leg of the circulation conduit 68, the ozone/water mixture continues intimate mixing with one another which assists with further dissolving of the ozone in the water. In order to facilitate a more complete and thorough mixing and/or dissolving of the ozone with the water, as soon as the water/ozone mixture enters the cold water compartment 28, via the circulation inlet, this water/ozone mixture then directly flows into an inlet of a sparger tube 64, manufactured substantially in accordance with U.S. Pat. Nos. 6,506,309 7,430,884 and/or 7,614, 260, or possibly an inlet of a static mixer 64 (as disclosed in U.S. Provisional Patent Application No. 61/435,555 filed Jan. 24, 2011 the subject matter of which is incorporated herein by reference), such as a static mixer manufactured substantially in accordance with U.S. Pat. No. 3,923,288 by Ozone Solution.

As the water/ozone mixture passes through and along the sparger tube/static mixer 64, the ozone is still further intimately and completely mixed and dispersed within and throughout the cold water. As a result, the sparger tube/static mixer 64 thereby facilitates a more complete and thorough dissolving of the ozone within the water. Thereafter, the ozonated cold water is then discharged from an outlet of the sparger tube/static mixer 64 directly into the cold water compartment 28 of the temporary storage tank 22. The ozonated water is then retained therein until such ozonated cold water is required by one or more of the washing machines 34. It is to be appreciated that most of the cold water, being supplied via the first segment 40 of the water supply line to the cold water compartment 28 generally first passes through the venturi 62 and the sparger tube/static mixer 64, prior to being supplied to any one of the washing machines 34.

The sparger tube/static mixer 64 generally extends radially inwardly, toward a center of the cold water compartment 28 before turning approximately 90° and extending substantially axially along a central axis of the temporary storage tank 22 away from a bottom of the tank. The ozonated cold water is finally discharged from an outlet of the sparger tube/static mixer 64 located in an upper region of the cold water compartment 28. It is to be appreciated that the discharge position from the sparger tube/static mixer 64 is critical to insure complete and thorough ozone absorption in the water and minimizing any non-absorbed ozone from being vented out of the vent tube 72. The discharge flow of the ozonated water, from the sparger tube/static mixer 64, is directly into the circumferential flow pattern of the cold water compartment 28 which is established by the baffle 51 when the unozonated cold water initially flows in through the cold water inlet 41.

The water supply according to the present invention generally employs the path of least assistance. That is, when one or possibly a couple of washing machines are simultaneously being filled with hot water, substantially all of the hot water being supplied to the hot water compartment 26 will immediately flow, via the hot water supply manifold 49, to the hot water heating device 18 for initial heating. However, when three or more washing machines, for example, are simultaneously being filled with hot water, the hot water heating device 18 is generally not capable of instantaneously heating the demanded amount of hot water. When this situation occurs, a portion of the cold water is supplied to the hot water heating device 18, via the hot water supply manifold 49, while a remaining portion of the water flows out through the apertures of the hot water supply manifold 49 and mixes with the hot water contained within the hot water compartment 26 and can, thereafter, be supplied to the washing machines 34 being filled. This arrangement ensures that the hot water flow to each one of the washing machines 34 is never restricted or hindered by the temporary storage tank 22. Moreover, as the cold water directly flows into the cold water compartment 28, this cold water can mix with the ozonated water contained therein and thereafter can be supplied to the washing machines 34 being filled. This arrangement ensures that the flow of cold flow water to each one of the washing machines 34 is also not restricted or hindered in any manner.

The combined compact hot and ozonated cold water unit 2 includes an ozone bleed off and vent conduit 72, which is designed to allow any undissolved ozone to be vented from the cold water compartment 28 of the temporary storage tank 22. If desired, the ozone bleed off and vent conduit 72 can be directly vented in a conventional manner (not shown) to the exterior of the laundry mat facility so as to prevent a hazardous situation from arising within the laundry mat (e.g., the accumulation of excess ozone within the laundry mat). Alternatively, the ozone bleed off and vent conduit 72 may be directly connected to a conventional ozone conversion device (not shown) which readily converts any excess ozone, which flows along the ozone bleed off and vent conduit 72, into oxygen which thereafter can be safely discharged directly within the laundry mat.

The hot water compartment 26 of the temporary storage tank 22 also includes a hot water discharge outlet 74 for supplying hot water, as necessary, along a conventional hot water supply bulkhead 76 to each one of the washing machines 34 accommodated within the laundry mat. In addition, the cold water compartment 28 of the temporary storage tank 22 also includes a cold water discharge outlet 78 for supplying cold water, as necessary, along a conventional cold water supply bulkhead 80 to each one of the washing machines 34 accommodated within the laundry mat.

During operation of the compact unit 2, when any one of the washing machines 34 requires hot water, such hot water is supplied along the hot water bulkhead 76 to the desired washing machine(s) 34 and dispensed into the associated drum (not shown) of that washing machine 34. Alternatively, when any one of the washing machines 34 requires cold water, such cold water is supplied along the cold water bulkhead 80 to the desired washing machine(s) 34 and dispensed into the associated drum of that washing machine 34. When any one of the washing machines 34 requires tepid water, generally an equal amount of both hot water and cold water is simultaneously supplied along the respective hot water and cold water bulkheads 76, 80 to the desired washing machine(s) 34 and dispensed into the associated drum of that washing machine 34.

As shown in FIGS. 1 and 3-5, the combined hot and ozonated cold water compact unit 2 is provided with a chase 82 which facilitates connection of a conventional air supplied duct to an air inlet 86 of the conventional hot water heater device 18, for supplying fresh combustion air thereto, and an exhaust duct 84, for exhausting the combustion byproducts of the condensing hot water heater device 18.

According to the present invention, during any hot water wash, the washing machine 34 is only initially filled with hot water during the initial wash cycle and thereafter all subsequent wash cycle(s) and/or rinse cycles of that washing machine 34 are solely supplied with ozonated cold water, supplied via the cold water bulkhead 80, to the washing machine 34. Similarly, for any warm (i.e., tepid) water wash, the washing machine 34 is only initially filled with equal amounts of both hot water and cold water, during the initial wash cycle, and thereafter all subsequent wash cycle(s) and/or rinse cycles of that washing machine 34 are solely supplied with ozonated cold water supplied, via the cold water bulkhead 80, to the washing machine 34. Finally, for any cold water wash, the washing machine 34 is initially filled with cold water and all subsequent wash cycle(s) and/or rinse cycles of that washing machine 34 are also only supplied with ozonated cold water, supplied via the cold water bulkhead 80, to the washing machine 34.

Figure 9:
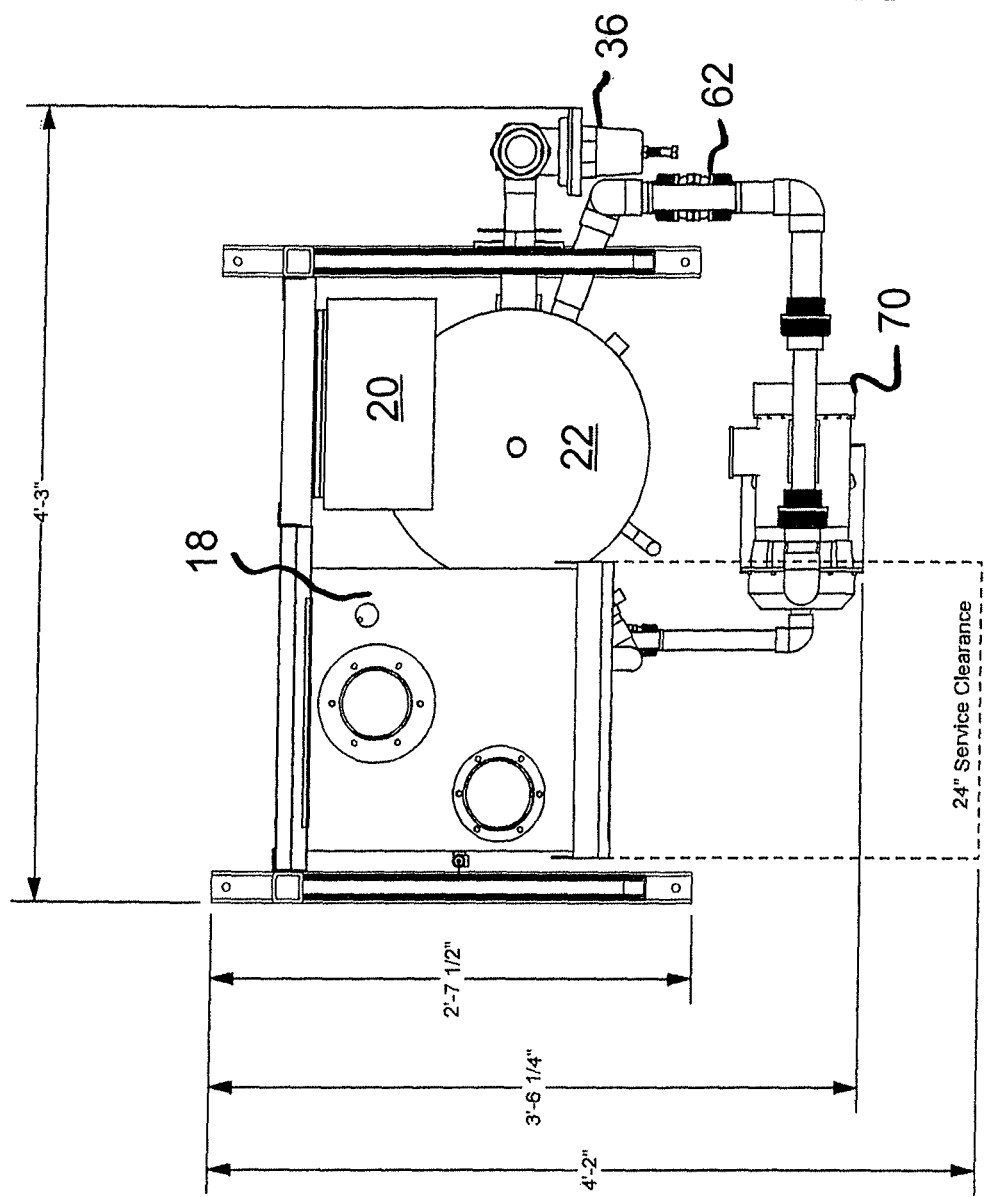
FIG. 9 is a diagrammatic top plan view of a second embodiment of the combined compact hot and ozonated cold water unit, according to the present invention, with the top and front panels removed for clarity.
Figure 10:
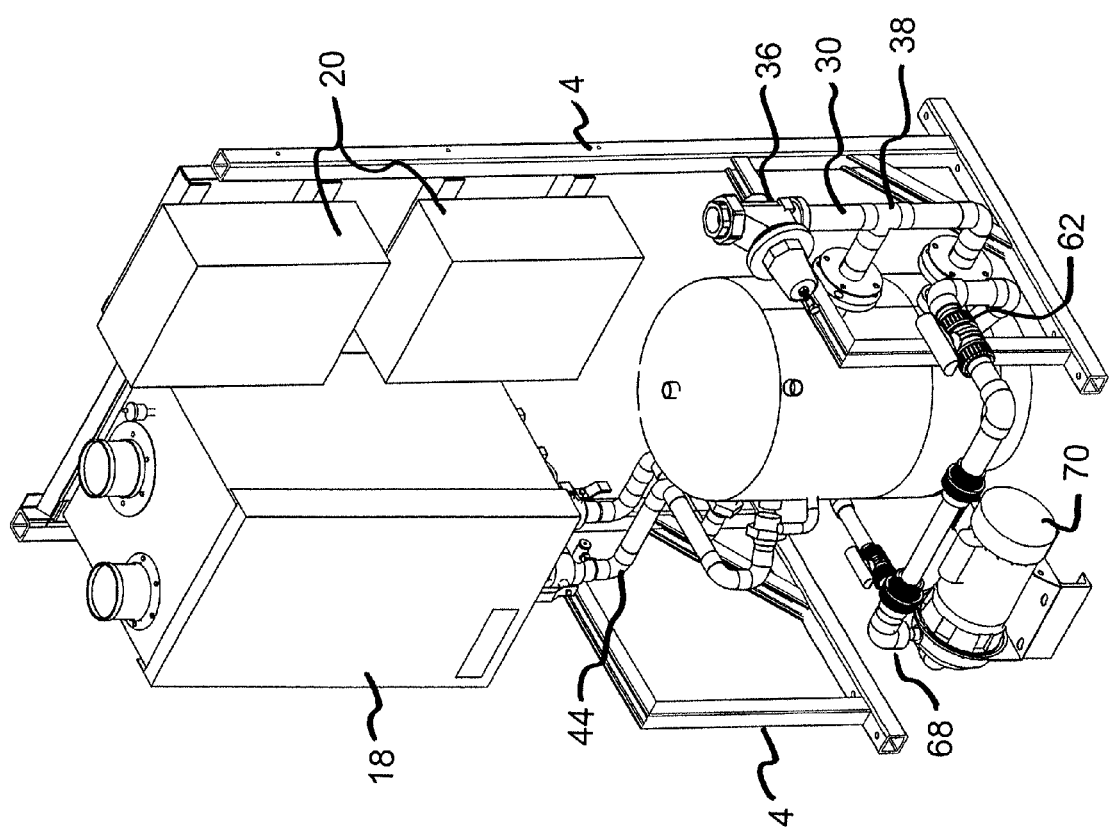
FIG. 10 is a diagrammatic top, front, right side perspective view of FIG. 9 with the top, front and side panels removed for clarity.
Figure 11:
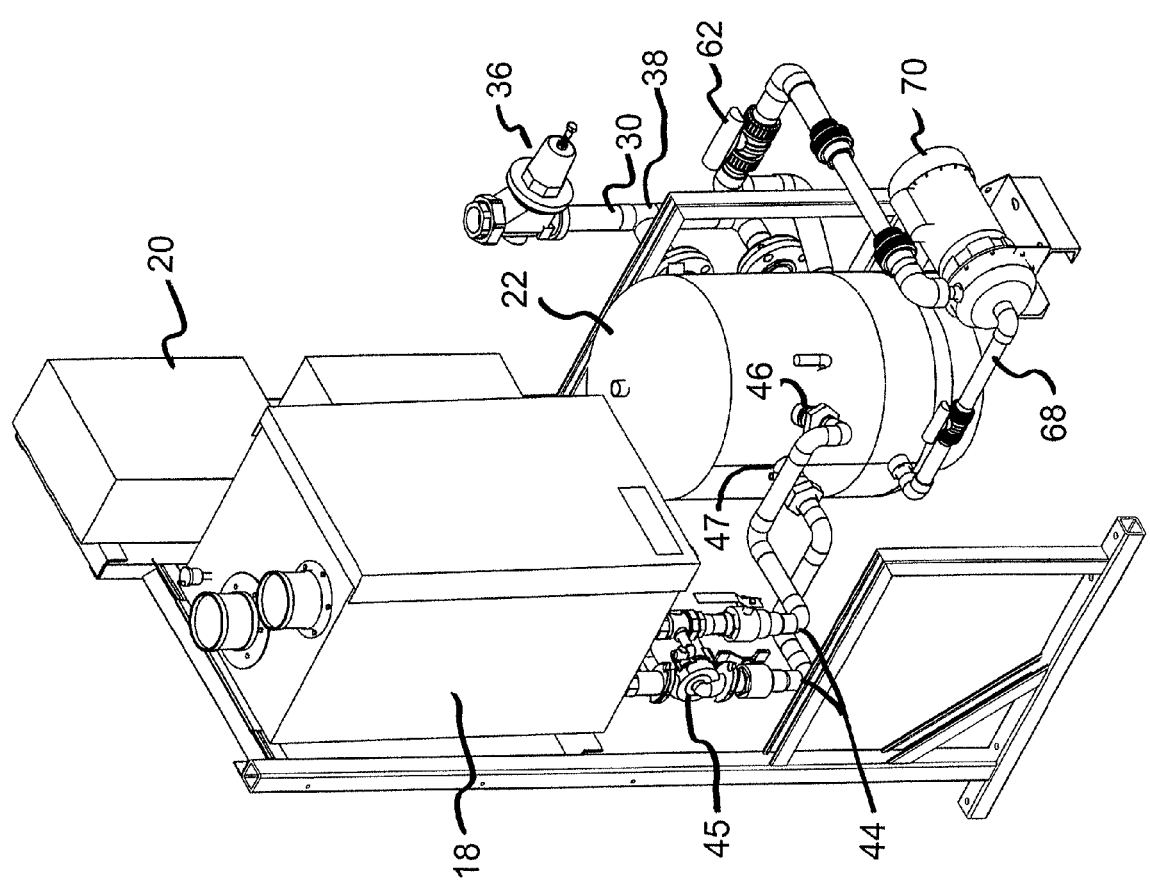
FIG. 11 is a diagrammatic top, front, left side perspective view of FIG. 9 with the top, front and side panels removed for clarity.

With reference now FIGS. 9-11, a second embodiment of the present invention will now be briefly discussed. As this embodiment is very similar to the first embodiment, the same reference numerals are utilized to depict the same or similar elements.

As shown in these Figures, the combined hot and ozonated cold water compact unit 2 also generally comprises a framework 4 which supports and accommodates the internal components of the compact unit. As with the first embodiment, a conventional hot water heater device 18, a conventional ozone generator device 20 and a combined hot and cold water temporary storage tank 22 are all accommodated within the internal cavity 13 of the combined hot and ozonated cold water compact unit 2 along with the associated plumbing and pumps. The major difference between this embodiment and the previous embodiment is that this embodiment is a "vertical" arrangement in which both the hot water heater device 18 and the conventional ozone generator device 20 are located vertically above the temporary storage tank 22. Accordingly, this embodiment generally only requires about 16 ft.$^2$ of floor surface area at the laundry mat but, as a result, generally does not provide a utility/folding surface like the first embodiment. In all other respects, this embodiment is substantially identical to the previous embodiment.

If so desired, a cold water supply manifold (not shown) may interconnect the cold water inlet 43, of the cold water compartment 28, directly with the cold water outlet 65 of the cold water compartment 28 for supplying the cold water to the venturi 62. The cold water supply manifold is manufactured substantially in accordance with U.S. Pat. No. 7,735,458, and the teachings of that reference are incorporated herein by reference. The cold water supply manifold has a plurality of apertures provided in the exterior surface of that manifold which permits, depending upon the flow rate through the cold water supply manifold, some of the ozonated cold water to be drawn into the cold water supply manifold, and mix with and be conveyed along with the ozonated cold water flowing within the cold water supply manifold, as the cold water flows therealong toward the venturi 62 for initial ozone treatment. This arrangement generally ensures that a majority of the cold water is initially ozonated before being directly discharged into the cold water compartment 28 of the temporary storage tank 22 for conveyance to any of the washing machine(s) 34. However, when simultaneous filling of a plurality of washing machines 34 occurs, some of the initially supplied cold water may flow out through the apertures directly into the cold water compartment 28 for supply to the washing machines 34 without first being ozonated. This ensures that the water flow rate does not in any way restrict or inhibit the water filling rate of any of the washing machines, particularly when three or more washing machines, for example, are being simultaneously filled with tepid and/or cold water.

The combined compact hot and ozonated cold water unit typically occupies a volume of 64 ft.$^3$ or so.

In the above description and appended drawings, it is to be appreciated that only the terms "consisting of" and "consisting only of" are to be construed in the limitative sense while of all other terms are to be construed as being open-ended and given the broadest possible meaning.

Since certain changes may be made in the above described improved the combined compact hot and ozonated cold water unit, without departing from the spirit and scope of the invention herein involved, it is intended that all of the subject matter of the above description or shown in the accompanying drawings shall be interpreted merely as examples illustrating the inventive concept herein and shall not be construed as limiting the invention.

We claim:

1. A combined compact hot and ozonated cold water unit, for supplying water to at least one washing machine, comprising:
   an ozone generator;
   a framework including:
   a hot water heater;
   a single combined temporary storage tank having both a hot water compartment and a separate cold water compartment, and the hot water compartment and the cold water compartment being separated from one another by a wall partition located between the hot and cold water compartments;
   the hot water heater for heating water flowing along a hot water circulation loop;
   the hot water circulation loop being connected with the hot water compartment of the single combined temporary storage tank for removing water from the hot water compartment and recirculating the heated water back to the hot water compartment;
   the ozone generator for supplying ozone to a cold circulation loop; and
   the cold water circulation loop being connected with only the cold water compartment of the single combined temporary storage tank for removing cold water from the cold water compartment.

2. The combined compact hot and ozonated cold water unit according to claim 1, wherein the hot water circulation loop circulates the hot water, via a recirculating hot water conduit, through a hot water booster heating system prior to returning the reheated hot water back to the hot water compartment of the single combined temporary storage tank.

3. The combined compact hot and ozonated cold water unit according to claim 1, wherein the cold water circulation loop circulates the cold water through an ozone dispersion device, which thoroughly mixes and disperses the supplied ozone within the cold water, prior to returning the cold water back to the cold water compartment of the single combined temporary storage tank.

4. The combined compact hot and ozonated cold water unit according to claim 1, wherein the single combined compact hot and ozonated cold water unit has a maximum size of about 64 ft.$^2$ and a top surface of the combined compact hot and ozonated cold water unit forms a utility surface with the laundry mat.

5. The combined compact hot and ozonated cold water unit according to claim 1, wherein the single combined temporary storage tank is partitioned into the hot water compartment which has a storage capacity of between about 10 and 50 gallons of hot water, and the separate cold water compartment which has a storage capacity of between about 5 and 35 gallons of cold water.

6. The combined compact hot and ozonated cold water unit according to claim 5, wherein the single combined temporary storage tank supplies both hot and cold water to the at least one washing machine, and a water supply line is connected with a variable pressure control valve which regulates a pressure of the water to be supplied to the single combined temporary storage tank.

7. The combined compact hot and ozonated cold water unit according to claim 6, wherein the water supply line includes a T-shaped coupling, located between the variable pressure control valve and the single combined temporary storage tank, which splits the water supply line into two separate water supply lines, a first segment of the water supply line is connected with a cold water supply inlet of the cold water compartment while a second segment of the water supply line is connected with a hot water supply inlet of the hot water compartment.

8. The combined compact hot and ozonated cold water unit according to claim 1, wherein the hot water heater is connected with a heating outlet of the hot water compartment of the single combined temporary storage tank, via a supply leg of the hot water circulation conduit, for supplying the cold water, along with some of the hot water contained within the hot water compartment of the single combined temporary storage tank, to the hot water heater for heating and then the heated hot water is conveyed back to the hot water compartment of the single combined temporary storage tank, via a return leg of the hot water circulation conduit and a hot water inlet, for temporary storage until the hot water is required by the at least one washing machine.

9. The combined compact hot and ozonated cold water unit according to claim 1, wherein a hot water pump is provided along the return leg of the hot water circulation conduit to facilitate pumping water from the single combined temporary storage tank to the hot water heater and returning the heated water back to the single combined temporary storage tank.

10. The combined compact hot and ozonated cold water unit according to claim 1, wherein a temperature sensor is located within the hot water compartment, of the single combined temporary storage tank, for measuring the water temperature of the hot water contained therein, and the temperature sensor is coupled to a control panel which controls required heating and reheating of the water contained within the hot water compartment by the hot water heater.

11. The combined compact hot and ozonated cold water unit according to claim 10, wherein the temperature sensor detects when cold water enters the hot water compartment of the single combined temporary storage tank and activates a heating cycle of the hot water heater for heating the water contained within the hot water compartment prior to delivery of the water to the at least one washing machine.

12. The combined compact hot and ozonated cold water unit according to claim 1, wherein a baffle redirects the cold water, which enters into the cold water compartment via a cold water inlet, in a circumferential direction to induce a swirling motion of the water stored within the cold water compartment of the single combined temporary storage tank and assist with agitating and mixing as well as maintaining and redissolving of any undissolved and non-vented ozone contained within the cold water compartment of the single combined temporary storage tank.

13. The combined compact hot and ozonated cold water unit according to claim 1, wherein the cold water compartment of the single combined temporary storage tank includes the cold water circulation loop which pumps cold water, via a first leg of the circulation conduit, from the cold water outlet of the cold water compartment to a circulation pump, a discharge end of the circulation pump is directly connected with a venturi, an outlet of the venturi communicates, via a second leg of the circulation conduit, with a cold water supply inlet of the cold water compartment, and the ozone generator is connected with an inlet of the venturi for supplying ozone thereto.

14. The combined compact hot and ozonated cold water unit according to claim 13, wherein the ozone generator generates ozone, to be supplied to and dissolved within the cold water being pumped by the circulation pump, so that when this ozonated cold water is eventually returned back to the cold water compartment, the supplied ozonated cold water contains an adequate amount of ozone, dissolved therein, to facilitate the cleaning of the laundry being washed.

15. The combined compact hot and ozonated cold water unit according to claim 13, wherein the venturi assists with accelerating the supplied cold water, as the cold water initially enters the venturi and then mixes with the ozone, supplied via the ozone inlet and thereafter, the mixture then decelerates and exits the venturi and flows along the second leg of the circulation conduit into the cold water compartment of the single combined temporary storage tank.

16. The combined compact hot and ozonated cold water unit according to claim 15, wherein, during conveyance along the second leg of the circulation conduit, the ozone and water mixture undergoes a dwell time which assists with intimate mixing and further dissolving of the ozone in the water to facilitate a more complete and thorough mixing of the ozone with the water upon flowing into an inlet of a sparger tube and entering the cold water compartment.

17. The combined compact hot and ozonated cold water unit according to claim 16, wherein the sparger tube further facilitates mixing of the ozone within the water and then discharges the water from an outlet of the sparger tube into the cold water compartment of the single combined temporary storage tank.

18. The combined compact hot and ozonated cold water unit according to claim 16, wherein the sparger tube extends radially inwardly toward a center of the cold water compartment before turning approximately 90° and extending substantially axially along a central axis of the single combined temporary storage tank away from a bottom of the tank.

19. A method of ozonating water using a combined compact hot and ozonated cold water unit, for supplying water to a washing machine, which comprises a framework including a hot water heater; an ozone generator; a single combined temporary storage tank having both a hot water compartment and a separate cold water compartment separated by a wall partition located between the hot and cold water compartments; the hot water heater being connected with the hot water compartment of the single combined temporary storage tank for heating the water contained therein; the ozone generator being connected with the cold water compartment of the single combined temporary storage tank for supplying ozone to the water contained therein, the method comprising the step of:

ozonating water contained within the cold water compartment via a cold water circulation loop and in the heating water contained within the hot water compartment prior to supplying water to the washing machine, the cold water circulation loop being connected with only the cold water compartment of the single combined temporary storage tank for removing cold water from the cold water compartment and returning ozonated cold water back to at least the cold water compartment.

20. A combined compact hot and ozonated cold water system, for supplying a desired amount of hot water and ozonated cold water to each one of a plurality of washing machines, the combined compact hot and ozonated cold water unit comprising:

an ozone generator;
    a framework enclosing at least:
        a hot water heater,
        a single combined temporary storage tank;
        a hot water circulation loop, and
        a cold water circulation loop;
    the single combined temporary storage tank having both a hot water compartment and a separate cold water compartment, and the hot water compartment and the cold water compartment being separated from one another by a wall partition contained within the single combined temporary storage tank;
    the hot water heater heating water flowing along the hot water circulation loop;
    the hot water circulation loop being connected with the hot water compartment of the singled combined temporary storage tank for removing water from the hot water compartment and supplying the removed hot water to the hot water heater recirculating the heated water back to the hot water compartment;

the ozone generator for supplying ozone to the cold water circulation loop; and the cold water circulation loop being connected with only the cold water compartment of the single combined temporary storage tank for removing cold water from the cold water compartment and mixing the removed cold water with ozone and returning ozonated cold water back to at least the cold water compartment.

* * * * *